Figure 1:
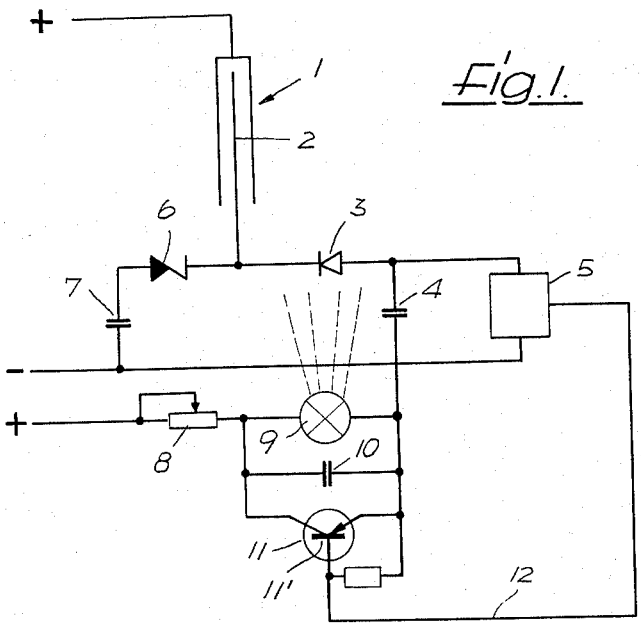

April 20, 1965     H. T. E. PYCHLAU ETAL     3,179,803
DEVICE FOR MEASURING THE QUANTITY OF ELECTRIC
CHARGES EMITTED FROM A SOURCE
Filed Nov. 6, 1961

INVENTORS
HERBERT THEODOR EDUARD PYCHLAU
WALTER FRANZ SCHELLENBERGER
BY

3,179,803
DEVICE FOR MEASURING THE QUANTITY OF ELECTRIC CHARGES EMITTED FROM A SOURCE
Herbert Theodor Eduard Pychlau, Mercystrasse 42, Freiburg im Breisgau, Germany, and Walter Franz Schellenberger, Eichbergstrasse 54, Freiburg-Littenweiler im Breisgau, Germany
Filed Nov. 6, 1961, Ser. No. 152,121
Claims priority, application Germany, Nov. 8, 1960, P 25,994
8 Claims. (Cl. 250—83.3)

The present invention relates to a coulomb meter which is provided with a counter for counting the number of discharges of a charging condenser which may be charged by the quantity of electricity to be measured and which is discharged by a relaxation circuit at a predetermined voltage. Coulomb meters of this known type are employed, for example, for dosimeters for measuring the dose of a radioactive radiation by exposing an ionization chamber which is under tension to said radiation and by measuring the current which is then flowing in this chamber.

If, for example, a dosimeter is employed for X-ray diagnostics, it is necessary to measure the dose of radiation to which the patient is exposed during the fluoroscopy and also when the X-ray photograph is being taken. During the fluoroscopy the patient is exposed to a relatively low dose rate of radiation for a greater length of time, while when an X-ray picture is being taken, he is exposed to a high dose rate of radiation for a very short time. These different dose rates have the effect that the electric current which is generated in the ionization chamber and charges the charging condenser of the coulomb meter varies in strength so that the time intervals during which the charging condenser reaches the predetermined voltage differ considerably from each other.

The maximum value of the current which may be measured with a coulomb meter of the above-mentioned kind depends, however, upon the resolving power of the relaxation circuit and of the counter which is connected to the outlet side of this circuit. If the quantity of electricity which is supplied and which is to be measured is temporarily so large that it cannot be eliminated by the successive discharges of the charging condenser, the operation of the mechanical counter will be blocked with the result that it will indicate values which differ considerably from the true values. In connection with an X-ray dosimeter as mentioned above the result will be, for example, that a coulomb meter which is sufficiently sensitive and the relaxation circuit and the mechanical counter of which therefore also have a sufficient resolving power will no longer be capable of measuring the dose of radiation when an X-ray picture is being taken.

Although expensive measuring devices are known which permit the respective doses to be properly measured at different dose rates, that is, at different doses per unit of time, an automatic registration of the measured result is then possible only by means of very complicated electronic apparatus which are very expensive and are therefore not applicable for the ordinary use.

It is an object of the present invention to provide a coulomb meter of the above-mentioned type which counts the number of discharges of a charging condenser by means of a counter and which is also capable of accurately measuring the quantities of electricity which are supplied at very different current intensities. The invention is based upon the concept of employing a storage condenser which if the amount of current supplied is too strong, permits the excessive amount to be stored and then to be slowly supplied to the charging condenser. The present invention consists in connecting a resistance, the resistance value of which increases in accordance with the voltage applied, between the supply line of the electric current to be measured and the charging condenser, and in connecting a storage condenser in parallel to the series formed by the resistance and the charging condenser. If the resistance provided is of the type which, regardless of the voltage applied thereon, always permits approximately the same amperage to pass therethrough, the result will be attained that, even though a larger quantity of electricity is supplied, the charging condenser will be charged only so quickly that the counter will still be capable of accurately counting the discharges of the condenser. The resistances to be applied may then consist of ionization chambers, photoelectric resistances, photoelectric cells, pentodes, or the like.

According to a preferred embodiment of the invention, a resistance may be employed which is responsive to radiation, for example, a light source which is capable of producing the conductivity of the resistance. This has the advantage that it is possible to control the conductivity of the resistance by means of the source of radiation. Thus, for example, the luminous power of a light source may be controlled by controlling its supply voltage, for example, by means of a hand switch. When this is applied to the above-mentioned field in connection with an X-ray dosimeter, this switch may, for example be coupled with the means for switching the apparatus from taking X-ray photographs to fluoroscopy so that the conductivity of the resistance of the coulomb meter will be automatically adjusted in such a manner in accordance with the supply of the quantities of electricity which are to be expected that the proper operation of the counter will be insured under all circumstances.

Very particular advantages may according to the invention be attained by connecting the light source into a circuit which may be controlled by control impulses which are produced by the relaxation circuit when the charging condenser is being discharged. It has been found quite unexpectedly that the counter itself will then be capable of regulating the resistance in accordance with its resolving power.

If, however, the quantities of the electric charge which are supplied within a certain length of time are very small, the periods within which the charging condenser is charged to the predetermined voltage is relatively long so that the operation of the coulomb meter is very sluggish. In order to overcome this sluggishness which is caused in such cases by the storage condenser, this condenser may be connected in series with a Zener diode the Zener voltage of which is slightly higher than the predetermined voltage of the charging condenser so that the storage condenser will be charged only if the end of the resistance which is remote from the charging condenser carries a voltage which is higher than the Zener voltage of the Zener diode. Despite the employment of a storage condenser the advantage will thus be attained that if small quantities of electricity are supplied per unit of time, only the charging condenser will become effective with the result that a relatively quick operation of the counter will thus be insured.

The above-mentioned objects, features, and advantages of the present invention will become more clearly apparent from the following detailed description thereof which is to be read with reference to the accompanying drawings, in which—

Figure 2:
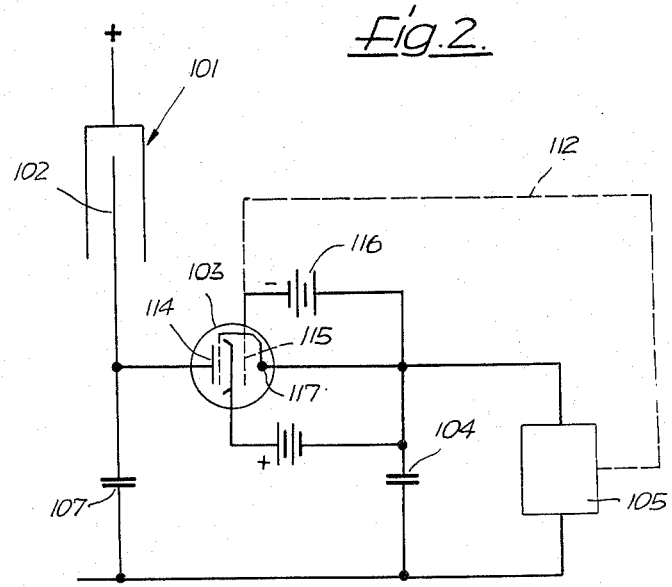

FIGURE 1 shows a circuit diagram of an X-ray dosimeter which is provided with a resistance in the form of a photodiode; while FIGURE 2 shows a circuit diagram of an X-ray dosimeter with a resistance in the form of a pentode.

In FIGURE 1 of the drawings, 1 indicates an ionization chamber with a collector electrode 2. When the ionization chamber 1 is exposed to ionizing radiation, the collector electrode 2 by the ionization of the air is charged with positive electricity of a quantity which is to be measured by a coulomb meter with a counter. The collector electrode 2 is connected through a photodiode 3 to a charging condenser 4 and to a relaxation circuit which is coupled with a counter as only indicated diagrammatically at 5 in the drawing. The photodiode 3 and the charging condenser 4 are connected in parallel to a Zener diode 6 and a storage condenser 7.

In order to make the photodiode 3 conductive, an incandescent bulb 9 is provided which is supplied with current through a rheostat 8 and has condenser 10 and a pnp transistor 11 connected in parallel thereto. This transistor 11 is connected in such a manner that it will normally block the flow of current so that it will not affect the brightness of bulb 9 which is adjusted by the resistance 8. The base 11' of the transistor 11 is connected through a line 12 to the relaxation circuit.

The manner of operation of this coulomb meter is as follows:

When the apparatus is switched on, bulb 9 will immediately light up and illuminate the photodiode 3. As soon as the ionization chamber 1 is exposed to an ionizing radiation, an ionization current will be formed therein which provides the electrode 2 with a positive charge. The strength of this ionization current depends upon the dose rate of the radiation, that is, upon the dose per unit of time. Thus, at an X-ray radiation intended for a fluoroscopic examination, the electrode 2 will be charged relatively slowly, while when an X-ray photograph is taken, it will be charged relatively quickly. This charge of electrode 2 may then flow off to the condenser 4 because of the conductivity of the photodiode 3 which is caused by the illumination thereof. Since the conductivity of the photodiode 3 is dependent upon the voltage to such an extent that at any voltages above a certain minimum size it permits the passage of substantially the same current, the intensity of which merely depends upon the strength of the illumination, the result will be attained that, regardless of the ionization current prevailing in the ionization chamber 1, the charging current of condenser 4 will at all times be of substantially the same size. As soon as the charging condenser 4 reaches the prescribed voltage, an impulse will be released in the relaxation circuit 5 whereby the charging condenser 4 will be discharged and at the same time the transistor 11 will be made conductive. Both electrodes of bulb 9 will thereby be short-circuited so that the light will be extinguished. Consequently the photodiode 3 blocks and therefore prevents a flow of electricity toward the charging condenser while this condenser is being discharged so that no electric charges of any quantity can flow off which have not as yet been measured. As soon as the impulse produced by the relaxation circuit 5 is terminated, the transistor 11 again blocks so that, after a delay which is caused by the RC unit formed by the resistance 8 and condenser 10 and which is adjusted to the resolving power of the counter, bulb 9 again lights up, whereupon condenser 4 is charged anew. If, however, the collector electrode 2 is then so strongly charged that the electricity cannot be conducted away through the charging condenser 4, the voltage on the collector electrode 2 will increase. As soon as this voltage reaches the Zener voltage of the Zener diode 6, the electricity can flow off from the collector electrode 2 toward the storage condenser 7. The storage condenser 7 is preferably charged to the releasing voltage of the relaxation circuit 5 before the measurement is carried out so as to prevent the occurrence of any measuring errors which might be caused by the charging of the storage condenser 7. If the flow of current toward the collector electrode 2 is interrupted, the storage condenser 7 can be discharged through the Zener diode 6 and the photodiode 3 toward the charging condenser 4.

In place of an incandescent bulb 9 it is also possible to employ a glow lamp which has the advantage that any measuring error which may occur during the discharging period of the charging condenser 4 will be very small even though the impulses of the relaxation circuit occur very rapidly.

FIGURE 2 illustrates a modification of the invention in which the charging resistance consists of a pentode 103. In order to avoid unnecessary repetition, all of the parts which have an effect similar to the parts as shown in FIGURE 1 are indicated by the same reference numerals which, however, are increased by 100.

The anode 114 of the pentode 103 is connected to the collector electrode 102 of the ionization chamber 101 and to a storage condenser 107. In this embodiment of the invention the Zener diode 6 has been omitted since it is not absolutely required if very small charging currents do not occur. In order to produce the required biasing voltage for the grid 115, the latter is connected to a voltage source 116. Cathode 117 of pentode 103 is connected to the charging condenser 104 and the relaxation circuit 105.

Since the current which flows through pentode 103 remains almost constant even though the anode voltage thereof changes, the charging condenser 104 will always be charged within the same period of time.

In order to attain the same effect as in the embodiment according to FIGURE 1, that is, to interrupt the charging current for a short time during the period of discharge of the charging condenser 104 by means of pentode 103 the control grid 115 of the pentode may also be supplied by the counter 105 with a negative impulse through a line 112, as indicated in FIGURE 2 in dotted lines.

The brightness of bulb 9 or the bias on grid 115 of pentode 103 may also be regulated as desired independently of the relaxation circuit 5 or 105, for example, by means of a rheostat 8 or similar control means.

In place of the photodiode 3 or the pentode 103 it is also possible to apply a different photosensitive element, for example, a photoresistance, an ionization chamber, or the like. It is also possible to employ for this purpose a resistance which can be regulated mechanically by a motor. In this case, the motor may be controlled by an electric apparatus of a known type in response to the number of impulses of the counter in a manner so as to adjust automatically the best possible resistance value.

Although our invention has been illustrated and described with reference to the preferred embodiments thereof, we wish to have it understood that it is in no way limited to the details of such embodiments, but is capable of numerous modifications within the scope of the appended claims.

We claim:

1. A coulomb meter adapted to measure the quantity of electric charges emitted from a source comprising a charging condenser, a counter for counting the number of discharges of said condenser, said condenser being adapted to be charged by the quantity of an electric charge to be measured, a relaxation circuit for discharging said condenser at a predetermined voltage, a resistance connected in series with the supply line of said electric charge to be measured and with said charging condenser, the resistance value of said resistance being adapted to increase in accordance with the voltage applied thereto so that independently of said voltage a current of substantially the same intensity always flows through said resistance, and a storage condenser connected in parallel with said series formed of said resistance and said charging condenser.

2. A coulomb meter adapted to measure the quantity of electric charges emitted from a source comprising a charging condenser, a counter for counting the number of discharges of said condenser, said condenser being adapted to be charged by the quantity of an electric charge to be measured, a relaxation circuit for discharging said condenser at a predetermined voltage, a radiation-responsive resistance connected in series with the supply line of said electric charge to be measured and said charging condenser, a source of radiation for controlling the conductivity of said resistance, the resistance value of said resistance being adapted to increase in accordance with the voltage applied thereto so that independently of said voltage a current of substantially the same intensity always flows through said resistance, and a storage condenser connected in parallel with said series formed of said resistance and charging condenser.

3. A coulomb meter adapted to measure the quantity of electric charges emitted from a source comprising a charging condenser, a counter for counting the number of discharges of said condenser, said condenser being adapted to be charged by the quantity of an electric charge to be measured, a relaxation circuit for discharging said condenser at a predetermined voltage, a photosensitive resistance connected in series with the supply line of said electric charge to be measured and said charging condenser, an electric light source for controlling the conductivity of said resistance, the resistance value of said resistance being adapted to increase in accordance with the voltage applied thereto so that independently of said voltage a current of substantially the same intensity always flows through said resistance, and a storage condenser connected in parallel with said series formed of said resistance and charging condenser.

4. A coulomb meter adapted to measure the quantity of electric charges emitted from a source comprising a charging condenser, a counter for counting the number of discharges of said condenser, said condenser being adapted to be charged by the quantity of an electric charge to be measured, a relaxation circuit for discharging said condenser at a predetermined voltage, a photosensitive resistance connected in series with the supply line of said electric charge to be measured and said charging condenser, an electric light source for controlling the conductivity of said resistance, a circuit containing said light source and adapted to be controlled by control impulses generated by said relaxation circuit during the discharge of said charging condenser, the resistance value of said resistance being adapted to increase in accordance with the voltage applied thereto so that independently of said voltage a current of substantially the same intensity always flows through said resistance, and a storage condenser connected in parallel with said series formed of said resistance and charging condenser.

5. A coulomb meter adapted to measure the quantity of elecrtic charges emitted from a source comprising a charging condenser, a counter for counting the number of discharges of said condenser, said condenser being adapted to be charged by the quantity of an electric charge to be measured, a relaxation circuit for discharging said condenser at a predetermined voltage, a photosensitive resistance connected in series with the supply line of said electric charge to be measured and said charging condenser, an electric light source for controlling the conductivity of said resistance, a circuit containing said light source and adapted to be controlled by control impulses generated by said relaxation circuit during the discharge of said charging condenser, an electronic switch connected in parallel to said light source and having a control electrode connected to the supply line of said control impulses, the resistance value of said resistance being adapted to increase in accordance with the voltage applied thereto so that independently of said voltage a current of substantially the same intensity always flows through said resistance, and a storage condenser connected in parallel with said series formed of said resistance and charging condenser.

6. A coulomb meter adapted to measure the quantity of electric charges emitted from a source comprising a charging condenser, a counter for counting the number of discharges of said condenser, said condenser being adapted to be charged by the quantity of an electric charge to be measured, a relaxation circuit for discharging said condenser at a predetermined voltage, a photosensitive resistance connected in series with the supply line of said electric charge to be measured and said charging condenser, an electric light source for controlling the conductivity of said resistance, a condenser connected in parallel to said light source, a resistance connected into the circuit of said light source and, with said last condenser forming an RC unit, the resistance value of said resistance being adapted to increase in accordance with the voltage applied thereto so that independently of said voltage a current of substantially the same intensity always flows through said resistance, and a storage condenser connected in parallel with said series formed of said resistance and charging condenser.

7. In a coulomb meter adapted to measure the quantity of electric charges emitted from a source comprising a charging condenser, a counter for counting the number of discharges of said condenser, said condenser being adapted to be charged by the quantity of an electric charge to be measured, a relaxation circuit for discharging said condenser at a predetermined voltage, a resistance connected in series with the supply line of said electric charge to be measured and with said charging condenser, the resistance value of said resistance being adapted to increase in accordance with the voltage applied thereto so that independently of said voltage a current of substantially the same intensity always flows through said resistance, a storage condenser connected in parallel with said series formed of said resistance and charging condenser, and a Zener diode connected in series with said storage condenser.

8. A dosimeter for measuring the dose of an ionizing radiation comprising a coulomb meter adapted to measure the quantity of electric charges emitted from a source, said coulomb meter comprising a charging condenser, a counter for counting the number of discharges of said condenser, said condenser being adapted to be charged by the quantity of an electric charge to be measured, a relaxation circuit for discharging said condenser at a predetermined voltage, a resistance connected in series with the supply line of said electric charge to be measured and with said charging condenser, the resistance value of said resistance being adapted to increase in accordance with the voltage applied thereto so that independently of said voltage a current of substantially the same intensity always flows through said resistance, and a storage condenser connected in parallel with said series formed of said resistance and charging condenser.

References Cited by the Examiner
UNITED STATES PATENTS

| | | | |
|---|---|---|---|
| 2,706,792 | 4/55 | Jacobs | 250—211 |
| 2,728,861 | 12/55 | Glass | 250—83.6 |
| 2,833,932 | 5/58 | Constable | 250—83.6 |
| 2,838,680 | 6/58 | Bender | 250—83.6 |
| 2,938,123 | 5/60 | Constable | 250—83.6 |
| 2,955,207 | 10/60 | Pearson | 250—83.6 |

RALPH G. NILSON, *Primary Examiner.*